（12）United States Patent
Bergström

(10) Patent No.: US 9,094,176 B2
(45) Date of Patent: Jul. 28, 2015

(54) METHOD AND APPARATUS FOR TIME ALIGNMENT UPON TIME ADVANCE GROUP SPLIT OR CREATION

(71) Applicant: Telefonaktiebolaget LM Ericsson (publ), Stockholm (SE)

(72) Inventor: Mattias Bergström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 278 days.

(21) Appl. No.: 13/703,732

(22) PCT Filed: Nov. 8, 2012

(86) PCT No.: PCT/SE2012/051216
§ 371 (c)(1),
(2) Date: Dec. 12, 2012

(87) PCT Pub. No.: WO2014/021752
PCT Pub. Date: Feb. 6, 2014

(65) Prior Publication Data
US 2014/0079033 A1 Mar. 20, 2014

Related U.S. Application Data

(60) Provisional application No. 61/679,160, filed on Aug. 3, 2012.

(51) Int. Cl.
*H04L 5/00* (2006.01)
*H04W 56/00* (2009.01)

(52) U.S. Cl.
CPC .......... *H04L 5/0078* (2013.01); *H04W 56/0045* (2013.01)

(58) Field of Classification Search
CPC .......... H04W 56/0045; H04W 56/004; H04W 56/005; H04W 56/0055; H04W 56/006; H04W 56/0065; H04W 56/007; H04W 56/0075; H04W 56/008; H04L 5/0078; H04L 7/0016; H04L 7/0033; H04L 7/0037; H04L 27/2655; H04L 27/2656

USPC .......... 370/336, 350, 503, 507, 508, 516, 519
See application file for complete search history.

(56) References Cited

U.S. PATENT DOCUMENTS

2012/0282969 A1* 11/2012 Jiang et al. ................. 455/517
2013/0044617 A1* 2/2013 Boixadera et al. ........... 370/252
(Continued)

FOREIGN PATENT DOCUMENTS

WO  WO 2012/059059 A1 *  5/2012  ........ H04W 56/0045

OTHER PUBLICATIONS

3rd Generation Partnership Project. "TAG change procedure for the SCell." 3GPP TSG-RAN WG2 Meeting #78, R2-122313, May 21-25, 2012, pp. 1-3, Prague, Czech Republic.
(Continued)

*Primary Examiner* — Thai Hoang
*Assistant Examiner* — Kenneth P Hunt
(74) *Attorney, Agent, or Firm* — Murphy, Bilak & Homiller, PLLC

(57) ABSTRACT

This disclosure details example methods and apparatuses for a wireless communication network and for devices operating in such networks that reduce or eliminate the need for performing random access procedures to obtain appropriate Timing Advance, "TA", values for use with new TA groups that include cells split from an existing TA group and/or new cells not in any existing TA groups defined for a given device. It is advantageously recognized herein that a TA relationship between one or more cells in an old or existing TA group of a device and one or more cells in a new TA group of the device may be known or otherwise estimated, e.g., based on known delay differences, cell sizes, etc. The TA relationship is used to initialize the TA value used for the new group, e.g., by copying or offsetting the current TA value of the old or existing TA group.

31 Claims, 9 Drawing Sheets

(56) References Cited

U.S. PATENT DOCUMENTS

| | | | |
|---|---|---|---|
| 2013/0058309 A1* | 3/2013 | Kuo | 370/331 |
| 2013/0235858 A1* | 9/2013 | Zhao et al. | 370/336 |
| 2013/0272229 A1* | 10/2013 | Dinan | 370/329 |

OTHER PUBLICATIONS

3rd Generation Partnership Project. "Considerations on remaining issues of TAG change." 3GPP TSG RAN WG2 Meeting #78, R2-122267, May 21-25, 2012, pp. 1-6, Prague, Czech Republic.

3rd Generation Partnership Project. "Group management for multiple TA." 3GPP TSG-RAN WG2 #75, R2- 114169, Aug. 22-26, 2011, pp. 1-3, Athens, Greece.

3rd Generation Partnership Project; Technical Specification Group Radio Access Network; Evolved Universal Terrestrial Radio Access (E-UTRA); Medium Access Control (MAC) protocol specification (Release 11); 3GPP TS 36.321 V11.0.0, Sep. 2012, pp. 34, 43.

3rd Generation Partnership Project; Technical Specification Group Radio Access Network; Evolved Universal Terrestrial Radio Access (E-UTRA); Requirements for support of radio resource management (Release 11); 3GPP TS 36.133 V11.2.0 Sep. 2012, p. 50.

* cited by examiner

METHOD AND APPARATUS FOR TIME ALIGNMENT UPON TIME ADVANCE GROUP SPLIT OR CREATION

RELATED APPLICATIONS

This application claims priority from the U.S. provisional patent application filed on 3 Aug. 2012 and assigned App. No. 61/679,160, which application is incorporated herein by reference.

TECHNICAL FIELD

The present invention generally relates to wireless communication networks and particularly relates to time alignment in such networks.

BACKGROUND

The propagation delays between a network base station and individual wireless communication devices transmitting uplink signals to the base station depends on the respective distances between the individual devices and the base station. Timing Advance or "TA" techniques provide for an adjustable delay at each wireless communication device, which controls the timing at the device between the start of a received downlink subframe and a transmitted uplink subframe. By dynamically adjusting the TA values used by the various devices, the base station ensures that uplink signals from the various devices are time aligned at the base station. In turn, receiving time-aligned uplink signals from multiple devices preserves the orthogonality between those uplink signals, as received at the base station.

In an example configuration, smaller TA values represent less timing advance and larger TA values represent more timing advance. In turn, more timing advance means less delay at the device between the start of a received downlink subframe and the corresponding uplink subframe transmission. Thus, devices that are further away from the base station and have longer signal propagation delays with respect to the base station use larger TA values, and devices that are closer to the base station use smaller TA values.

In a known approach, a base station determines the appropriate TA value for any given device based on measurements of its uplink signals. In networks based on the Long Term Evolution, "LTE", standard, a User Equipment, "UE", obtains initial uplink synchronization in a given cell using a random access procedure. Here, the term "cell" connotes given air interface resources within a given geographic coverage area. Thus, two cells may wholly or partly overlap geographically but use different carrier frequencies or different frequency subbands within a defined carrier frequency bandwidth, for example.

In any case, according to known TA value initialization procedures used to gain initial uplink synchronization with a given cell in the network, the UE transmits a preamble on a Random Access Channel, "RACH". The cell's eNodeB—an LTE base station—determines an initial TA value for the UE based on measurements performed on the preamble transmission, and the eNodeB transmits the initial TA value to the UE in a random access response message. The initial TA value is an absolute TA value of 11 bits. The eNodeB subsequently adjusts the UE's TA value, as needed, to maintain the UE in uplink synchronization with the cell. The subsequent adjustments are based on the eNodeB sending Timing Advance Command Medium Access Control, "MAC", Control Elements or "CEs". These subsequent TA commands are 6 bits and represent delta updates to the TA value.

The same TA value may be applied by the UE for its uplink transmissions to a group of cells in the network, where such groups are referred to as Timing Advance Groups or "TAGs". Each TA group has one TA value and an associated TA timer. This arrangement complicates evolving service scenarios, such as those based on Carrier Aggregation, "CA" and/or Coordinated Multi-Point, "CoMP" service.

With CA, more than one carrier is used to serve a UE or other wireless communication device. These multiple carriers are referred to as Component Carriers or "CCs" and they generally include a Primary Carrier from a Primary Cell or "PCell" and at least one Secondary Carrier from a Secondary Cell or "SCell". Among the several cells involved in CA service, the Primary Carrier from the PCell serves as a reference or anchor carrier that is used by the UE for radio link failure monitoring and certain other reference functions.

CoMP expands the multiple carrier idea by using a coordinated set of eNodeBs and/or other transmission/reception points in the network to serve a given UE. In general, at any given time, only a subset of cells within a CoMP cluster is used to serve a given UE. However, that subset dynamically changes as given cells in the CoMP cluster become more or less attractive for use in serving the UE, based on cell loading, changes in the location of the UE relative to the various CoMP transmission/reception points in the cluster, and other factors.

According to recent agreement in the Third Generation Partnership Project, "3GPP", for serving cells that are in the same TAG as the UE's PCell, the downlink reception timing of the PCell serves as the timing reference. For serving cells in a TAG not containing the UE's PCell, the downlink reception timing of a serving cell selected by the UE should be used as the downlink timing reference. Also, note that when a UE receives an initial or subsequent TA command, it starts the TA timer associated with the TAG for which the TA command was received. The UE considers itself to be in uplink synchronization with the cells belonging to the TAG associated with the received TA command so long as the associated TA timer is running Thus, the UE may perform Physical Uplink Shared Channel, "PUSCH", and Physical Uplink Control Channel, "PUCCH", transmissions in those cells.

However, as noted above, if the UE loses uplink synchronization with the cell(s) in a TAG, or wishes to transmit on cell(s) in a new TAG with which it has not gained uplink synchronization, the UE must carry out the aforementioned random access procedure and then use the initial TA value returned from the network before performing any PUSCH or PUCCH transmissions on the cell(s) in the TAG. Such requirements complicate operation, particularly in scenarios like CoMP, in which a dynamically changing mix of cells is used to serve a given UE. Moreover, it is recognized herein that such requirements result in significant inefficiencies in many practical scenarios involving the creation of new TAGs for a UE or other device operating within a wireless network.

SUMMARY

This disclosure details example methods and apparatuses for a wireless communication network and for devices operating in such networks that reduce or eliminate the need for performing random access procedures to obtain appropriate Timing Advance, "TA", values for use with new TA groups that include cells split from an existing TA group and/or new cells not in any existing TA groups defined for a given device. It is advantageously recognized herein that a TA relationship between one or more cells in an old or existing TA group of a device and one or more cells in a new TA group of the device may be known or otherwise estimated, e.g., based on known delay differences, cell size differences, etc. The TA relationship is used to initialize the TA value used for the new group, e.g., by copying or offsetting the TA value from the old or existing TA group.

As such, rather than a UE or other device having to perform a random access procedure on one or more cells in a new TA group to obtain the appropriate initial TA value for that new TA group, it is taught herein to use a TA value for the new TA group that is copied from or otherwise derived from an existing or old TA group of the device. Thus, the TA value of a new TA group is initialized not by the device making a random access and receiving an initial TA value in return, but rather by the device applying a TA value that is copied from or derived from a TA value used by the device for an existing or old TA group. The copying or derivation may be performed on the network side or on the device side, and various signaling and processing options are detailed herein for both cases.

In one example, a wireless communication device, hereafter "device", is configured to perform a method of timing alignment processing for uplink signal transmissions by the device to one or more cells in a wireless communication network. The method includes the device receiving one or more messages indicating the creation of a new TA group for the device, and the device correspondingly setting a TA value to be applied at least initially for uplink transmissions to cells in the new TA group, based on a current TA value used for one of the existing TA groups of the device, or according to a signaled TA value sent from the network as part of or in advance of the one or more messages indicating the creation of the new TA group. Note that the signaled TA value, which may be implicitly signaled by the network, may be advantageously determined on the network side, based on copying or modifying one of the TA values already in use by the device.

In a general sense, the network and/or the device initialize the TA value to be applied at the device for a new TA group based on a known or estimated TA relationship between one or more cells in an existing TA group of the device and one or more cells in the new TA group. For example, the new TA group includes one or more cells split from the existing group, in which case the TA value to be used for the new TA group is copied from the existing group, or is calculated based on some offset relative to the TA value of the existing group.

Thus, in a network-side example, a network node, such as an LTE eNodeB or other network base station, is configured to perform a method of timing alignment processing that includes sending one or more TA reconfiguration messages to a wireless communication device, to create a new TA group for the device. The new TA group includes one or more cells having a known or estimated TA relationship to one or more cells in an existing TA group of the device. The method advantageously includes signaling a TA value or a TA offset value to the device based on the known or estimated TA relationship.

The signaled TA value or TA offset value will be used by the device in setting the TA value initially applied to the new TA group, meaning that the controlling network node(s) skip ordering the device to perform the random access procedure that would normally be required for the device to obtain initial uplink timing synchronization with the cells in the new TA group. Based on this advantageous initialization of the TA value used by the device for the new TA group, the network-side method includes sending adjustment commands to the device, as needed, subsequent to the creation of the new TA group, to adjust the TA value applied by the device for the new TA group.

Here and elsewhere in this disclosure, "signaling" a TA value or TA offset value to the device does not necessarily mean that the TA value or TA offset value itself is signaled. As a non-limiting example, the network node may simply send an index value or other identifier corresponding to an existing TA group of the device, and the device may be configured to copy the TA value of the indicated TA group as the TA value to be used initially for the new TA group, or to calculate the initial TA value of the new TA group by applying an offset to the indicated TA group.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
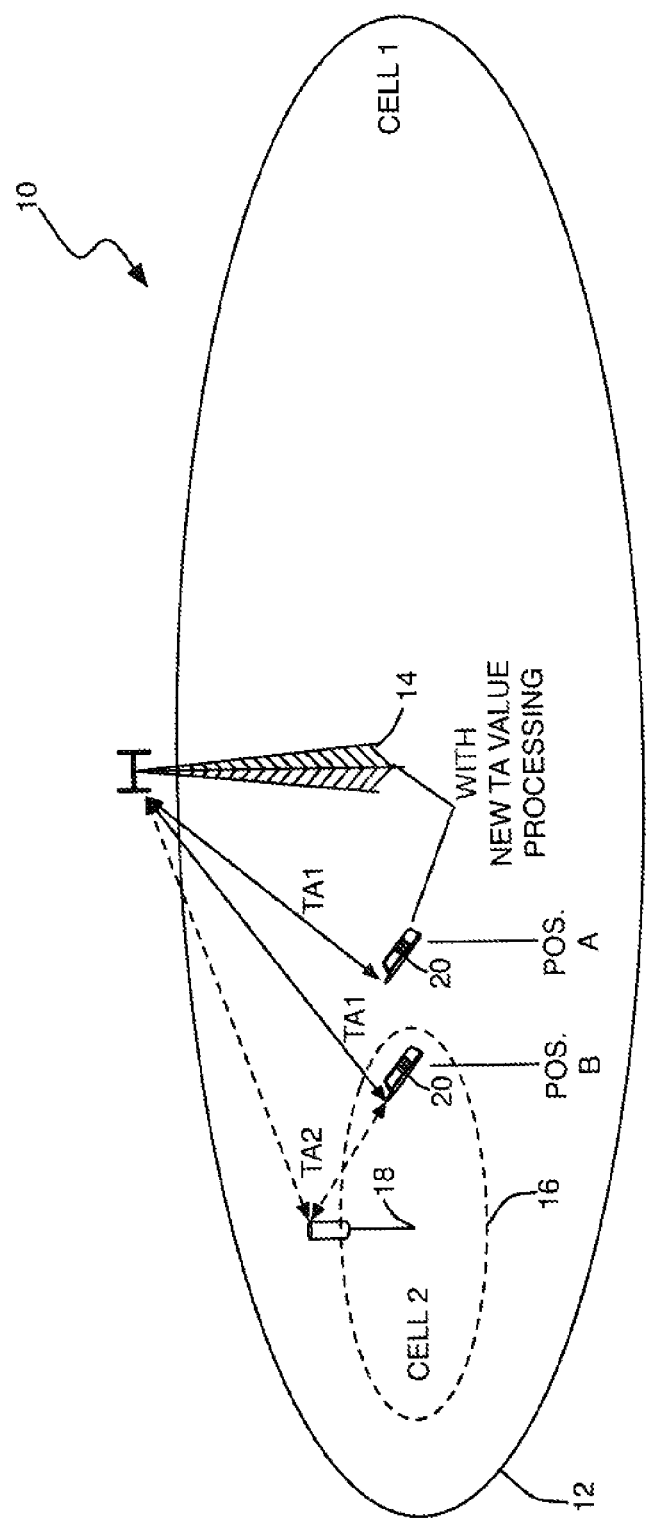
FIG. 1 is a block diagram of a wireless communication network in one embodiment, wherein the depicted base station and wireless communication device are configured to perform the new Timing Advance, "TA", processing taught herein.

FIG. 1 illustrates a wireless communication network 10, hereafter "network 10". The network 10 includes a cell 12 that is associated with a base station 14, and further includes another cell 16 associated with another base station 18. While the base stations 14 and 18 are not necessarily different, they may be different in terms of their powers and areas of coverage and they may play different roles within the overall operation of the network 10.

In the non-limiting example of FIG. 1, the network 10 operates as a heterogeneous network, wherein the base stations 14 and 18 are of different types and wherein the cell 16 associated with the base station 18 overlays the cell 12 associated with the base station 14. In such arrangements, the cell 12 may be referred to as a "macro" cell serving a relatively larger geographic area than that served by the cell 16, which may be referred to as a "hotspot" or "micro", "pico", or "femto" cell.

In general, the network 10 includes multiple cells 12 and/or 16, supported by multiple corresponding base stations 14 and/or 18. Of course, those skilled in the art will also recognize that the teachings herein apply to homogeneous network deployments, e.g., where the network 10 includes a number of cells 12 and corresponding base stations 14. In any case, the wireless communication devices 20, hereafter "device 20" or "devices 20", may be served from one or more of cells 12 and/or 16, in dependence on several factors, including their relative positions with respect to such cells. For ease of discussion, the phrase "cell 12, 16" shall be understood as referring to a cell 12 and/or a cell 16, unless otherwise noted. Similar, the phrase "base station 14, 18" shall be understood as referring to a base station 14 and/or a base station 18, unless otherwise noted.

With that in mind, a given device 20 operating within the network 10 uses Timing Advance, "TA" values for synchronizing its uplink transmissions with respect to individual cells 12, 16, and with respect to groups of such cells 12, 16—i.e., TA groups. Advantageously, one or more of the depicted base stations 14, 18 and the depicted device 20 are configured to implement network-side and device-side methods, respectively, which provide for efficient initialization of the TA value used for a new TA group. In particular, the base stations 14, 18 and/or the device 20 initialize the TA value for a new TA group based on a known or estimated TA relationship between one or more cells in the new TA group and one or more cells in an existing TA group of the device 20. As used here, an "existing" TA group is not necessarily one that continues to be used by the device 20 after creation and initialization of the new TA group; rather the term "existing" means a TA group that is in existence for the device 20 at the time the new TA group is created. Thus, no particular distinction is made herein between the terms "old TA group" and "existing TA group" unless needed for clarity.

Figure 2:
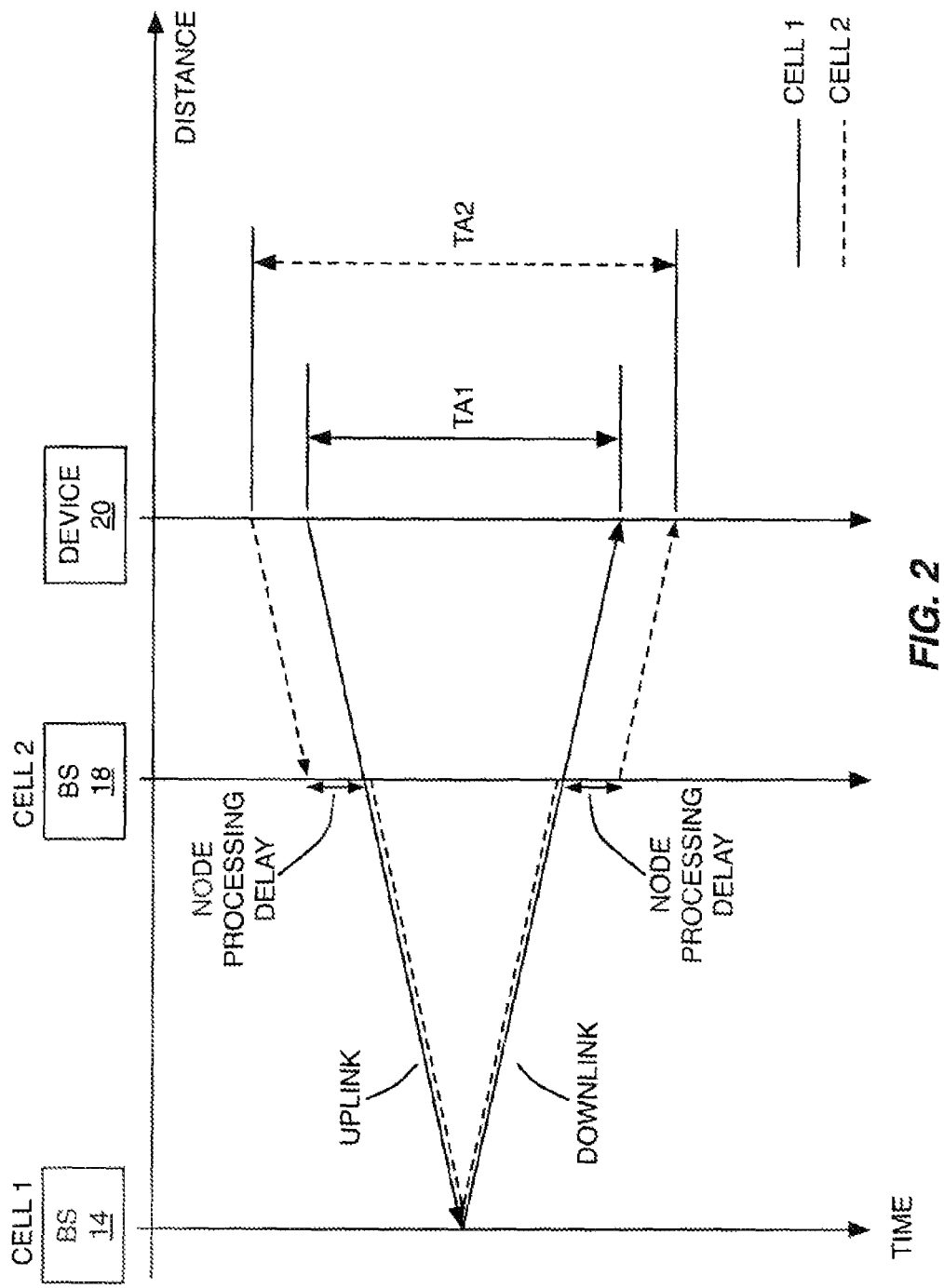
FIG. 2 is a diagram of an example TA relationship between cells associated with different nodes in a wireless communication network, which can be exploited as taught herein for TA value initialization.

FIG. 2 illustrates an example TA relationship that may be known or estimated. In the example illustration, a base station 14 is referred to as the diagram as "BS 14" and a base station 18 is referred to "BS 18". The base station 14 provides service in a cell 12 that is referenced in the figure as "CELL1". Similarly, the base station 18 provides service in a cell 16 that is referenced in the diagram as "CELL2". Referring back to FIG. 1, momentarily, one sees that CELL1 may be the depicted cell 12 as associated with the base station 14, and that CELL2 may be the depicted cell 16 as associated with the base station 18.

When the device 20 is operating at the position marked "POS. A" in FIG. 1, it may be served only by the base station 14 using a TA value denoted as "TA1" in FIG. 2. However, when the device 20 moves to the position marked as "POS. B" in FIG. 1, it may be served on radio links from both the base station 14 and from the base station 18—i.e., it may receive and process downlink signals from both CELL1 and CELL2 and transmit synchronized uplink signals in both such cells. It is recognized herein that the TA value appropriate for uplink transmissions in CELL2, denoted as "TA2" in FIG. 2, has a TA relationship to TA1. More particularly in the example of FIG. 2, uplink signals from the device 20 as received in CELL2 experience a known or estimable processing delay as compared to uplink signals that are received in CELL1 directly from the device 20.

In another example, the node 14 offers both CELL1 and CELL2 and the node 18 repeats only CELL2—e.g., the node 18 is a frequency-selective repeater. At POS. A, the device 20 communicates with the node 14 for CELL1 and CELL2. As such, the device 20 operates with an existing TA group that includes CELL1 and CELL2, where that TA group uses a TA value appropriate for signal propagation between the node 14 and the device 20. However, if the device 20 moves to POS. B, it will get CELL1 from the node 14 and CELL2 from the node 18. Thus, when moving from POS. A to POS. B, a TA group split would occur for the device 20, where the CELL2 would be moved from the existing TA group, to a new TA group. The TA value for the new TA group can be copied from the TA value used for the existing TA group.

Thus, in an example case, the device 20 operates for some time at POS. A and uses TA1 to synchronize its uplink transmissions with respect to CELL1, where the base station 14 adjusts TA1 as needed to maintain such synchronization. At some later time, the device 20 moves towards POS. B, which triggers the creation of a new TA group for the device 20, where the new TA group includes at least CELL2. Advantageously, the known or estimated TA relationship between CELL1 and CELL2 is exploited to determine the initial value of TA2, for use by the device 20. Doing so eliminates the need for the device 20 to perform a random access procedure in CELL2 to obtain an appropriate initial value for TA2. In one example, the current value of TA1 as last adjusted is copied and used as the initial value for TA2. In another example, an offset—referred to as a TA offset value—is applied to TA1 and the resulting TA value is used as the initial value of TA2.

The TA offset value corresponds to the known or estimated processing delay difference associated with CELL2, in relation to CELL1. In general, such TA offset values may be defined in accordance with 3GPP TS 36.211: Physical Channels and Modulation. That is, a TA offset value may be expressed as a number of TA value steps—i.e., steps of $16T_S$ as defined in TS 36.211. Of course, other mechanisms for specifying TA value offsets are contemplated herein, such as by having a table of predefined offset values, and specifying given offsets as table index values.

A base station 14, 18 is configured, for example, with data embodying a known or expected offset relative to TA1, where that offset represents the additional delay associated with CELL2 relative to CELL1. Further, multiple delay values may be involved. For example, when the base station 18 associated with CELL2 is a repeater, the delays involved depend on whether the repeater is operating in both uplink and downlink directions, or only in one direction. The delays to consider are different for the two possibilities. If the repeater is operating in both the uplink and downlink directions, the delay difference of interest is the sum of downlink and uplink processing delays.

The difference in propagation delays for direct communications in CELL1 as compared to communicating through CELL2 is expected to be in the order of a few milliseconds. The base station 14, 18 can be configured to store a representative or actual value for this delay, as a known or estimated TA relationship between CELL1 and CELL2. Knowledge of the actual or estimated delay differences between cells 12, 16 provides significant advantages when initializing the TA value of a new TA group that includes a cell 12, 16 having a known TA relationship to a cell 12, 16 in an old or existing TA group of the device 20. For example, if a cell 12, 16 in the new TA group is being split from an existing TA group of the device 20, it is reasonable to copy the TA value in use for the existing group as the starting TA value for the new TA group, or to initialize the TA value by offsetting the TA value of the existing group, based on detected misalignment, or some other initial adjustment. Such operations have broad advantages in terms of avoiding the need for random access procedures for TA value initialization, and are expected to yield particularly significant benefits in heterogeneous and repeater-based network environments, where the mix of cells 12, 16 used to serve a given device 20 may change relatively frequently.

Broadly, then, it is contemplated herein to determine the TA value for a new TA group based on adjusting the TA value associated with an old or existing TA group of the device 20. The adjustment may be determined at the device 20 or in the network 10 as an offset associated with differences in processing node delays between the network nodes involved in the old and new TA groups and/or based on knowledge of network deployment details, cell selection criterions, knowledge of other TA values in use by the device 20, or TA values known to be associated with or typical for the current location of the device 20, or otherwise based on positioning information obtained for the device 20.

In a more detailed example, an eNodeB or other type of base station 14, 18 uses different criteria for adding a cell 12, 16 to a TA group for the device 20. For example, the eNodeB may not add a repeater-based cell 12, 16 until the repeater signal strength exceeds a relatively high signal strength threshold, which can be understood as effectively shrinking the coverage area of the repeater-based cell 12, 16. With a relatively small coverage area, the initial TA value used for any TA group that includes the repeater-based cell 12, 16 may be copied from the TA group that includes the cell 12, 16 that is extended by the repeater-based cell 12, 16.

Of further note, the base station 14, 18 in some embodiments "knows" the approximate position of a device 20 by examining the TA values in use at the device 20, as each TA value relates to a propagation path distance. Thus, the base station 14, 18 can determine a "suitable" TA value to use for a new TA group for the device 20, based on knowing the distance of the device 20 from the base station 14, 18, or relative to any transmit/receive node of interest in the network 10. Such distances may be calculated based on the relationship: TA value=2*distance/speed of light. The 2*distance term arises because TA values compensate for round trip delay—i.e., propagation from a base station 14, 18 to a device 20 and back to the base station 14, 18.

Figure 3:
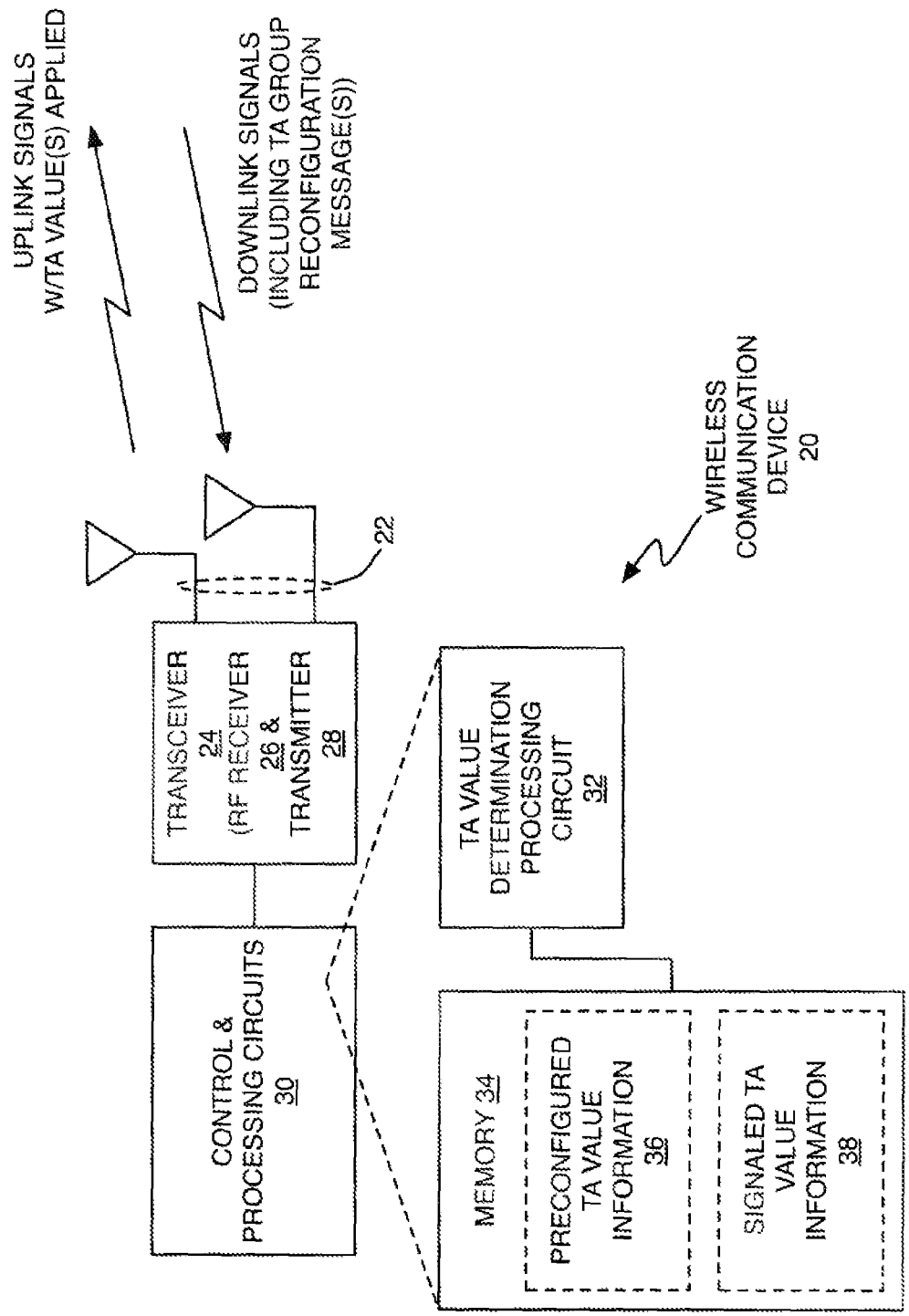
FIG. 3 is a block diagram of one embodiment of a wireless communication device.

FIG. 3 illustrates an example embodiment of a device 20, as contemplated herein. The device 20 includes one or more receive and transmit antennas 22 and an associated transceiver 24 configured to transmit uplink signals to one or more cells 12, 16 in the network 10 and to receive downlink signals from one or more cells 12, 16 in the network 10. Accordingly, the transceiver 24 includes a RF receiver 26 and a RF transmitter 28, which are associated with control and processing circuits 30, which include one or more baseband processors for transmit and receive signal processing, for example. At least functionally, the control and processing circuits 30—referred to generally as "one or more processing circuits 30" or simply "processing circuits 30"—include a TA value determination processing circuit 32.

The one or more processing circuits 30 include, for example, one or more microprocessors, microcontrollers, DSPs, FPGAs, ASICs, or other digital processing circuitry that is configured to perform all or part of the device-side TA value initialization processing taught herein. Such processing is based, for example, at least in part on the execution of computer program instructions stored in a computer-readable medium, such as the illustrated memory 34. The memory 34 may further store preconfigured TA value information 36 and/or signaled TA value information 38, as received from the network 10. Such TA value information is used by the TA value determination processing circuit 32 to initialize the TA values for new TA groups, at least for the case where the new TA groups include cells 12, 16 having a known or estimated TA relationship to one or more cells 12, 16 in an existing TA group of the device 20.

Thus, the processing circuits 30 are configured to perform timing alignment processing for uplink signal transmissions by the device 20, based on being configured to: receive one or more messages via the transceiver 24, indicating the creation of a new TA group for the device 20; and set the TA value to be applied at least initially for uplink transmissions to cells 12, 16 in the new TA group, based on a current TA value used for one of the existing TA groups of the device 20, or according to a signaled TA value sent from the network 10 as part of or in advance of the one or more messages indicating the creation of the new TA group.

In one example, the processing circuits 30 are configured to follow a rule according to which the device 20 sets the TA value of a new TA group equal to or offset from the current TA value of the TA group that includes a primary cell for the device 20. To the extent that the device 20 has more than two existing TA groups defined for it, the processing circuits 30 would copy the TA value, as last adjusted, for the TA group that includes the primary cell, "PCell", of the device 20, and use the copied value as the initial value of the TA value to be used for the new TA group. Alternatively, rather than merely copying the TA value of the PCell TA group, the processing circuits 30 calculate the initial value of the TA value by applying an offset to the TA value of the PCell group. In an example, network signaling controls whether the device 20 simply copies an existing TA value or offsets an existing TA value, for use in initializing the TA value of the new TA group.

In a generalized example, the processing circuits 30 are configured to initialize the TA value of a new TA group to the current TA value in use for a selected one of the existing TA groups. Alternatively, the processing circuits 30 are configured to calculate the TA value for the new TA group by applying an offset value to the current TA value in use for a selected one of the existing TA groups. In this and other examples, the processing circuits 30 are configured to determine the selected TA group based on a rule preconfigured in the device 20 or according to signaling from the network 10.

If the network 10 sends signaling indicating the TA value to be used by the device 20 as the TA value for a new TA group, the indicated TA value is referred to as a "default TA value" if the signaling comes in advance of the network messaging that creates a new TA group. If the indicated TA value is signaled as part of such messaging, it is referred to as an "explicit TA value". However, the reader should not confuse the term "explicit TA value" as necessarily meaning explicit signaling of the actual TA value to be used. Whether a default or explicit TA value is signaled by the network 10, the TA value itself may not be signaled directly. Instead, the network 10 may signal the TA value by sending an indicator, pointer, or other value that has a known mapping to or association with a TA value or TA offset value known to the device 20.

In another embodiment, the processing circuits 30 are configured to determine a selected TA group according to a configured rule. That is, the device 20 uses a rule to select which one of its existing TA groups it uses as the basis for setting the initial value of the TA value to be used for the new TA group. In one example, the device 20 copies the current TA value of the selected TA group, for use as the TA value initially used for the new TA group. In another example, the device 20 calculates the TA value of the new TA group by applying an offset to the current TA value of the selected TA group. As suggested earlier herein, the "rule" may be that the device 20 selects the existing TA group that includes the cell 12 or 16 that is operating as the device's PCell.

Because the initialization of the TA value for a new TA group is accomplished without need for the device 20 performing a random access procedure towards one of the cells 12 or 16 in the new TA group, the network 10 can perform adjustments of that TA value subsequent to its initialization, as needed—that is, the network 10 can skip ordering the device 20 to make a random access for purposes of gaining uplink synchronization with respect to the cells 12, 16 in the new TA group. In this regard, the processing circuits 30 at the device 20 are configured to adjust the TA value of the new TA group—after initializing it—responsive to subsequent TA adjustment commands signaled from the network 10.

Figure 4:
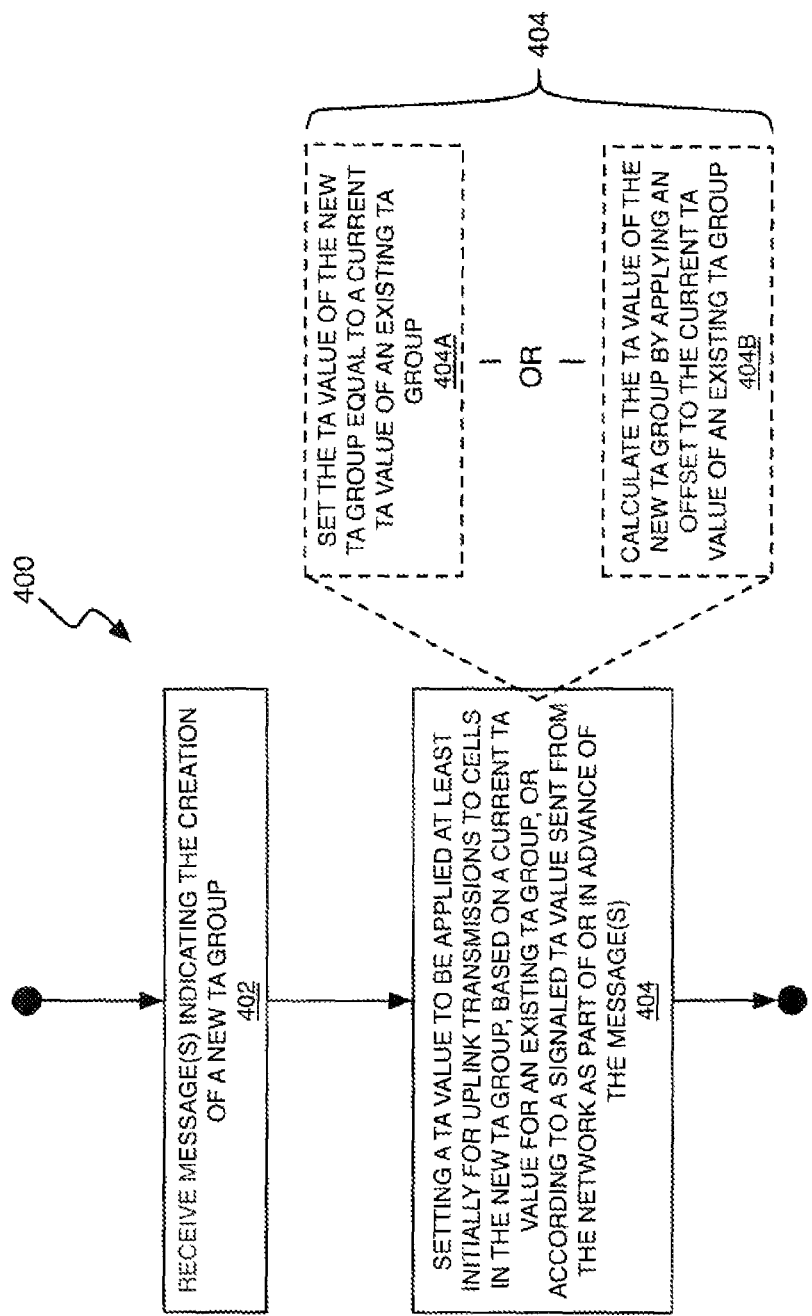
FIG. 4 is a logic flow diagram of one embodiment of a method of TA value initialization as implemented by the wireless communication device of FIG. 3, for example.

FIG. 4 illustrates one embodiment of a device-side method 400 corresponding to the above-described processing configuration of the processing circuits 30. The illustrated method 400 of timing alignment processing for uplink signal transmissions by the device 20 to one or more cells 12, 16 in the network 10 includes: receiving one or more messages indicating the creation of a new TA group for the device 20 (Block 402); and setting the TA value to be applied at least initially for uplink transmissions to the cells 12, 16 in the new TA group, based on a current TA value used for one of the existing TA groups of the device 20, or according to a signaled TA value sent from the network 10 as part of or in advance of the one or more messages indicating the creation of the new TA group (Block 404).

In one variation of the processing represented by Block 404, the processing circuits 30 set the TA value of the new TA group equal to a current TA value of an existing TA group (Block 404A). In another variation, the processing circuits 30 set the TA value of the new TA group by calculating the TA value based on applying an offset value to the current TA value of an existing TA group of the device 20 (Block 404B). Note, too, that the device 20 may be capable of performing both such approaches and use one approach at given times and use the other approach at other times.

Figure 5:
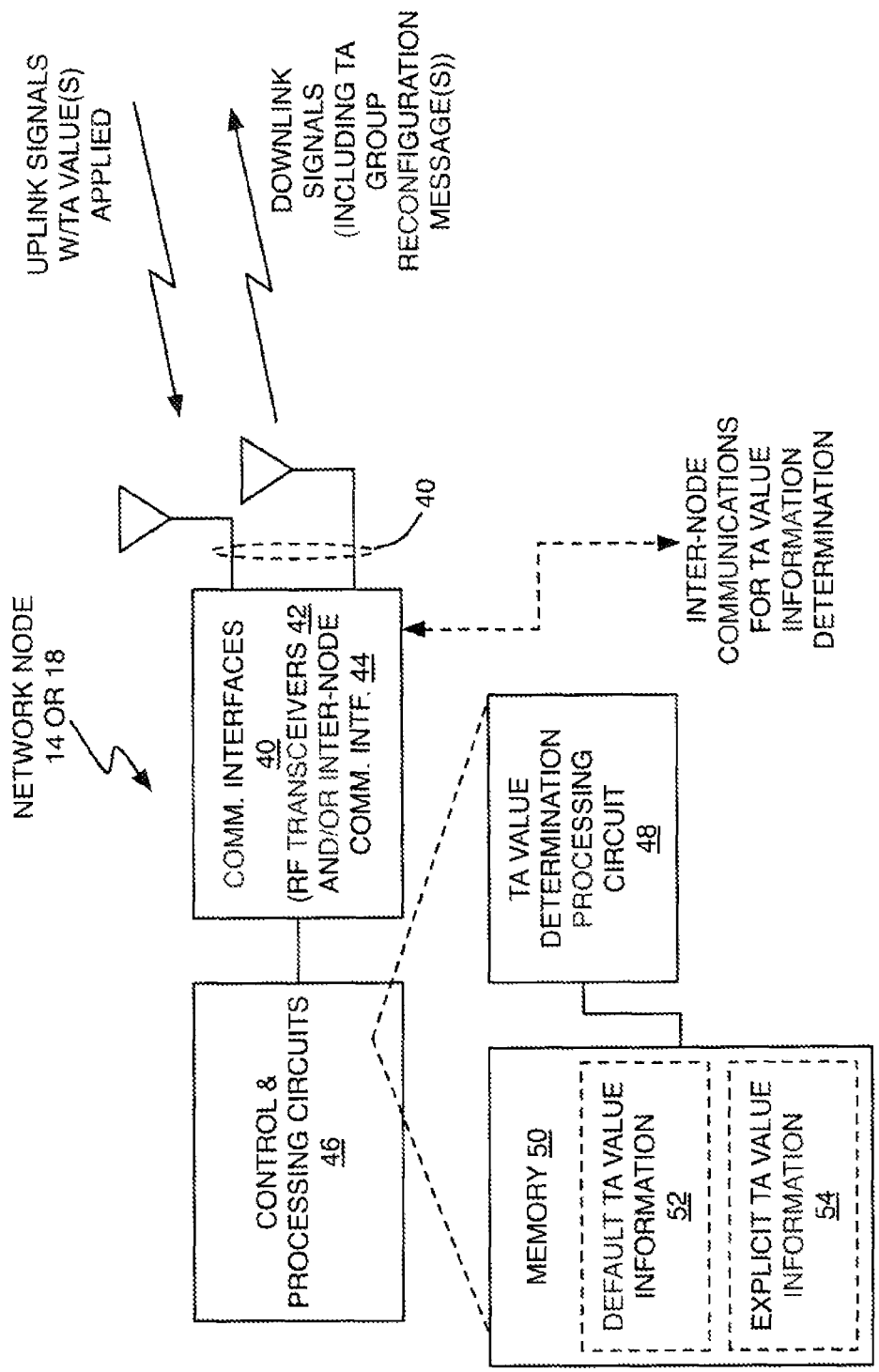
FIG. 5 is a block diagram of one embodiment of a network node, which may be one of the base stations introduced in FIG. 1, for example.

Turning more particularly to the network side of the teachings herein, FIG. 5 illustrates a network node, such as one of the base stations 14, 18. In other examples which depend on the type of network 10 involved, the network node may be a base station controller in the Radio Access Network or "RAN". Further, the network node may be located in a Core Network or "CN" that is associated with the RAN, e.g., a positioning node or other entity in the CN.

As an example network node, the illustrated base station 14, 18 includes one or more communication interfaces 40, including at least one of: an RF transceiver 42 configured for receiving uplink signals from devices 20 operating in one or more cells 12 and/or 16 of the network 10 and transmitting downlink signals to the one or more devices 20; and an inter-node communication interface 44 configured for communication with one or more other network nodes. The node further includes one or more processing circuits 46, which are broadly referred to as "one or more processing circuits 46" or "processing circuits 46".

In an example embodiment, the processing circuits 46 at least functionally include a TA value determination processing circuit 48, which is configured to determine the initial TA value for a new TA group for a given device 20, based on exploiting a known or estimated TA relationship between one or more cells 12, 16 in an old or existing TA group of the device 20 and one or more cells 12, 16 in the new TA group. For clarity, it should be noted that the same TA value is used for all cells 12, 16 in a given TA group, so the initial TA value used for the new TA group is the same for all cells 12, 16 in the new TA group. However, the TA relationship is not necessarily explicitly known or estimated for every cell 12, 16 in the new TA group, e.g., it may be enough to know the TA relationship between a given cell 12, 16 in the new TA group and a given one or more cells 12, 16 in the old TA group, and further to know that the initial TA value used for the new TA group is appropriate for the further cells 12, 16 in the new TA group.

To facilitate using the TA relationship to set the initial TA value of the new TA group, the processing circuits 46 include or are associated with a computer-readable medium, such as a memory circuit 50 or other storage device or unit. The memory circuit 50 stores, for example, computer program instructions that are executed by the processing circuits 46, to perform the network-side method(s) taught herein. The memory circuit 50 also may store default and/or explicit TA value information 52 and 54, for use in setting the TA value of a new TA group.

These and other architectural details are non-limiting, as other arrangements can be configured to provide the same or similar functionality. In any case, the processing circuits 46 are operatively associated with the one or more communication interfaces 40 and are configured to: send one or more TA reconfiguration messages to device 20, to create a new TA group for the device 20. The new TA group includes one or more cells 12, 16 having a known or estimated TA relationship to one or more cells 12, 16 in an existing TA group of the device 20. The node exploits the known or estimated TA relationship in that the processing circuits 46 are configured to signal a TA value or a TA offset value to the device 20 based on the known or estimated TA relationship. The processing circuits 46 are further configured to send adjustment commands to the device 20, as needed, subsequent to the creation of the new TA group, to adjust the TA value used for the new TA group.

In an example case, the new TA group includes one or more new cells 12, 16 and the known or estimated TA relationship comprises a known or estimated path and/or processing delay of the new cell 12, 16 relative to that of a cell 12, 16 in an existing TA group of the device 20. Correspondingly, the processing circuits 46 are configured to signal the TA value or TA offset value to be used by the device 20 for the new TA group based on one of: signaling the TA value as a calculated TA value determined from the current TA value used for the existing group and the known or estimated delay of the new cell 12 or 16; or signaling the TA offset value based on the known or estimated delay of the new cell 12 or 16.

The new TA group may include cells 12, 16 that are split from an existing TA group, or it may include one or more new cells 12 and/or 16, or some mix of both. In a scenario where the new TA group includes a cell 12 or 16 being split from an existing TA group, the processing circuits 46 are configured to signal the TA value or TA offset value based on one of: signaling the TA value as a value equal to or offset from a current TA value in use for the existing TA group; or signaling the TA offset value as a value relative to the current TA value in use for the existing TA group.

As for the new TA group itself, the processing circuits 46 are configured to create the new TA group, for example, in response to detecting a timing misalignment for uplink signal transmissions by the device 20 to one or more cells 12 or 16 in the existing TA group. That is, in one or more embodiments, the processing circuits 46 detect uplink timing misalignment for one or more cells 12 or 16 in an existing TA group of the device 20, and that detection triggers a splitting, wherein a new TA group is created for the cells 12 or 16 for which the misalignment was detected and the TA value for the new TA group is advantageously set according to a known or estimated TA relationship between one or more cells 12 or 16 in the old TA group—the one being split—and one or more cells 12 or 16 in the new TA group.

The known or estimated TA relationship, for example, comprises a known or estimated difference in processing delays between nodes associated with the existing TA group and the new TA group. Referring back to FIG. 2, for example, the TA value denoted as TA2 may be determined based at least in part on a known or estimated extra processing delay incurred for service through the base station 18 associated with CELL2, as compared to service directly through the base station 14 associated with CELL1. Such cases apply, for example, when a repeater is used to extend the coverage of a donor base station. In the same or other embodiments, the known or estimated TA relationship is based at least in part on the cell size of one or more cells 12 or 16 in the new TA group and one or more cells 12 or 16 in the existing TA group. Thus, the TA relationship may partly depend on processing delay as well as on cell size. For example, if the new TA group includes a repeater cell 12, 16 that is small, a suitable TA value for the new TA group may be very similar to the TA value of an existing TA group that includes the donor cell 12, 16 being repeated. However, if the cell size is large, there may be a larger difference between the suitable TA value of the new TA group and that of the existing TA group.

Consider a scenario where an eNodeB offers two cells 12 or 16, one at 800 MHz (large coverage) and one at 2000 MHz. (e.g., a repeater, having a relatively small coverage area is deployed to extend the coverage of the larger cell). The device 20 may be far away from the eNodeB and can therefore only be configured for the lower frequency, large coverage area cell. Later, if the device 20 moves into the coverage of the repeater, it can be configured to use the high frequency cell. The eNodeB may then order that the TA value of the new TA group to be the TA value of the old TA group, or as some value offset from the TA value of the old TA group.

In a similar scenario, one or more cells 12 or 16 are split from an existing TA group and logically "moved" to a new TA group that is associated with a repeater. The eNodeB is aware that some, but not necessarily all cells 12, 16 are served by the repeater and the eNodeB knows approximately the processing delay of the repeater. Based on this knowledge, the eNodeB derives an appropriate TA value for the repeated cell, or an appropriate offset value to be added to the TA value of the non-repeated cell 12, 16, to obtain a suitable TA value for the device 20 to use at least initially for the repeated cell. For example, the eNodeB may be configured to determine the TA value to use initially for the repeated cell as the TA value of the non-repeated cell plus the known or estimated processing delay imposed by the repeater, or it may simply provide offset value information to the device 20, so that device 20 can determine the TA value to use at least initially for the repeated cell 12, 16 by applying the offset to the TA value used by the device 20 for the non-repeated cell 12, 16.

In another example, the eNodeB may be configured such that it is not necessary for the eNodeB to know the processing delay of the repeater. Instead, the eNodeB continuously measures the TA alignment of the device 20 on different cells 12, 16, based on determining when uplink signals from the device 20 arrive at the eNodeB for the different cells 12 and/or 16. When the device 20 moves in to the coverage of a repeater, the repeated cells will be misaligned and the eNodeB measures the misalignment of the repeated cells and sends an offset to the UE. Alternatively, the eNodeB does not send an offset but instead orders the device 20 to set the TA value, at least initially, to the old TA value. Subsequently, the eNodeB sends a TA command, via a MAC control element or "CE", which updates the TA value to an appropriate value. That is, the TA value is initialized to the old TA value, and then updated as appropriate.

Broadly, then, in cases where the network 10 knows or can otherwise calculate the appropriate TA value for the new TA group in advance, the network 10 can be configured to signal the TA value to use for a new TA group in advance to the device 20, so that a random access procedure is avoided in the new TA group. In one example, the TA value for the new TA group is signaled in the message that creates the new TA group. In another example, the TA value for the new TA group is signaled in the message that specifies the moving cell or cells—i.e., in the message that indicates which serving cell(s) are being disassociated from the old TA group and associated with the new TA group and, of course, also may indicate one or more new cells to be included in the new TA group.

Notably, where the existing TA group is one among two or more existing TA groups defined for the device 20, the processing circuits 46 are configured to signal a TA value or a TA offset value to device 20 by sending an indication to the device 20. The indication indicates which one of the existing TA groups the device 20 should select for use in setting the TA value initially applied to a new TA group. Here, it will be understood that the device 20 is configured to set the TA value of the new TA group to the current TA value of the selected TA group, or to calculate the TA value of the new TA group by offsetting the current TA value of the selected TA group.

Figure 6:
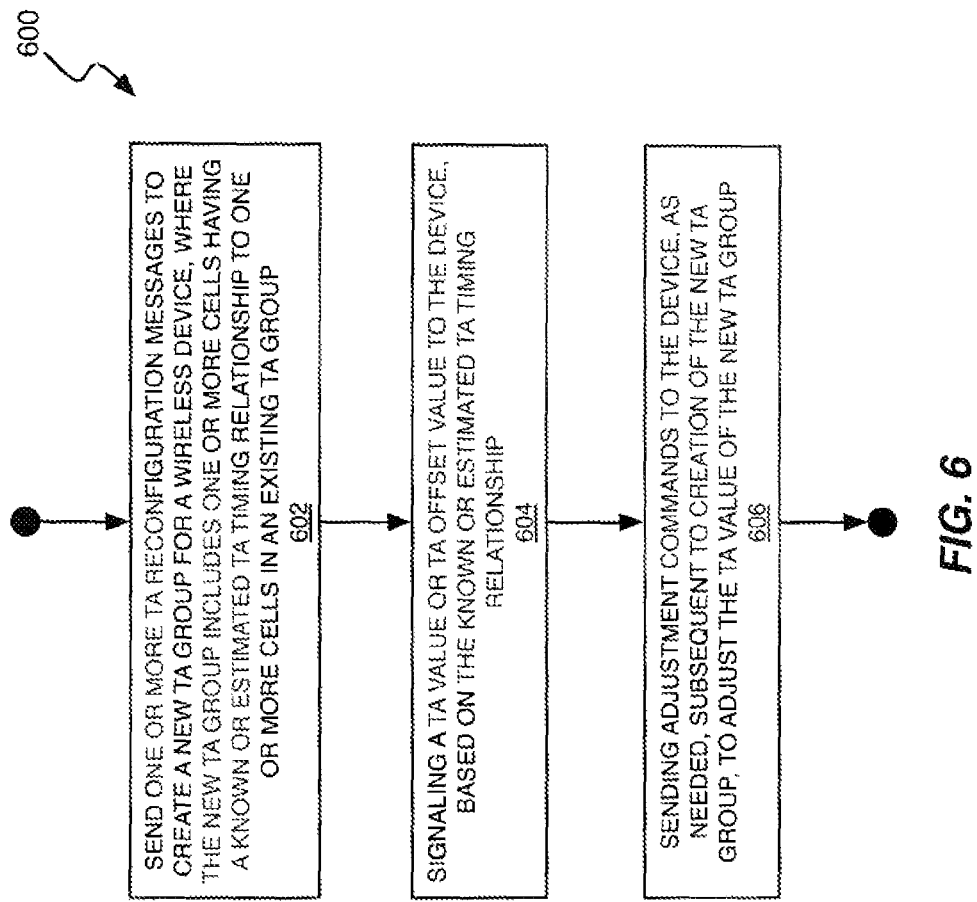
FIG. 6 is a logic flow diagram of one embodiment of a method of TA value initialization as implemented by the network node of FIG. 5, for example.

FIG. 6 illustrates an example embodiment of a network-side method 600, which may be performed by a network node, such as the base station 14 or 18 illustrated in FIG. 5. The method 600 provides timing alignment processing in the node and includes sending one or more TA reconfiguration messages to device 20 (Block 602), to create a new TA group for the device 20. The new TA group includes one or more cells 12 and/or 16 having a known or estimated TA relationship to one or more cells 12 and/or 16 in an existing TA group of the device 20.

The method 600 further includes signaling a TA value or a TA offset value to the device 20 based on the known or estimated TA relationship (Block 604). As noted, the signaled TA value or TA offset value will be used by the device 20 in setting the TA value initially applied to the new TA group. The method 600 therefore includes sending adjustment commands to the device 20, as needed, subsequent to the creation of the new TA group, to adjust the TA value (Block 606).

In some embodiments of the above method, a default TA value is signaled to the device 20 in advance of creating the new TA group. Optionally, an explicit TA value is signaled to the device 20 in the messaging used to create the new TA group. If the device 20 receives this optional, explicit value during such messaging, that explicit TA value is considered as overriding the earlier-signaled default TA value—i.e., for the new TA group being created by the messaging, the device 20 uses the explicit TA value, or some offset from it, for use with the new TA group, rather than using the earlier-signaled default TA value. Conversely, if the device 20 does not receive an explicit TA value during the messaging creating a new TA group but earlier received a default TA value, it applies the default TA value—possibly with some offset—to the new TA group.

This approach adds flexibility on the network-side, as the network 10 can configure the default TA value to a suitable value and not signal explicit TA values to the device 20, unless there is some need to override the default value. In a further variation, a memory or other storage in the device 20 contains a pre-configured default value that it uses as the TA value initially applied to a new TA group, unless the network has sent another default TA value to use instead. In this manner, the device 20 gives preference to the default value signaled by the network 10, if the network sends such a value, and otherwise uses its "built in" default value.

Figure 7:
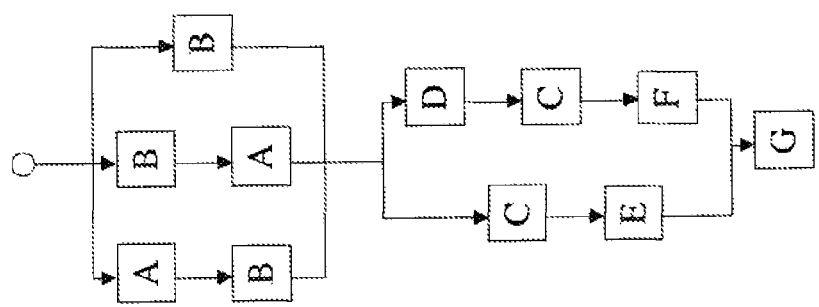

Such operation suggests some of the flexibility of operation provided by the teachings herein. FIG. 7 illustrates example combinations of network-side and device-side processing reflecting such flexibility. The processing flows embodied in FIG. 7 relate to cases involving signaling by the network 10 of the TA value to be applied by a device 20 to a new TA group formed, for example, as a consequence of splitting an old TA group. The signaled TA value is sent in advance of the new TA group creation, i.e., as a default TA value to be used in the absence of a later-received explicit TA value, or is sent as an explicit TA value as part of the messaging used to create the new TA group.

It will be appreciated that multiple processing flows may be provided for in the operational configuration of the involved base stations 14 and 18, or other involved network nodes, and in the device 20. In particular, in FIG. 7, the following applies:
"A" denotes the network 10 sending a default TA value to be applied by a device 20 in case no explicit TA value is signaled in conjunction with creating a new TA group for the device 20;
"B" denotes the detection at the network 10 of a timing misalignment for the uplink signals from the device 20, with respect to one or more cells 12, 16 in an existing TA group of the device 20;
"C" denotes the sending of a reconfiguration message from a base station 14 or 18 in the network 10, to the device 20, ordering the device 20 to split an existing TA group or to create a new TA group with one or more new cells 12, 16;
"D" denotes the network 10 signaling an explicit TA value to use for a new TA group being created for the device 20, and it should be noted that Step "D" can be done in conjunction with Step "C" or otherwise subsumed into Step "C";
"E" denotes the device 20 applying the default TA value to a new TA group;
"F" denotes the device 20 applying an explicitly signaled TA value to a new TA group; and
"G" denotes the device 20 carrying out TA group reconfiguration processing.

For example, the processing flow A-B-C-E-G may be followed, wherein the network 10 signals a default TA value to be applied by the device 20 in case no TA value is signaled when an existing TA group is split (Block A). Subsequently, the network 10 detects that the device's uplink signals for at least one cell 12, 16 in an existing TA group are not arriving time aligned, which means that the TA value being applied by the device 20 for that existing TA group is not suitable for all cells 12, 16 currently included in that existing TA group (Block B).

In response to the timing misalignment detection, the network 10 signals a TA group reconfiguration message ordering the device 20 to split the existing TA group (Block C). Because no explicit TA value was signaled for the new TA group being created as a consequence of the TA group split, the device 20 applies the default TA value earlier signaled in Block A to the new TA group (Block E) and performs TA group reconfiguration processing to reflect the TA group split and the creation of the new TA group (Block G).

An alternative flow is A-B-D-C-F-G. Blocks A and B are the same as above, but the flow transitions from Block B to Block D, rather than Block C as done in the first flow. Block D comprises the network 10 sending an explicit TA value for the device 20 to apply to the new TA group. Thus, the network 10 sends the explicit TA value to the device 20 and then, as before in Block C, sends a group reconfiguration message (Block C), ordering the device 20 to split the identified existing TA group. Because the network 10 signaled an explicit TA value to be applied to the new TA group, processing continues (Block F) with the device 20 using the signaled TA value for the new TA group and performing TA group reconfiguration accordingly (Block G).

Other possible flows include B-A-C-E-G. This flow is characterized by the network 10 first detecting the timing misalignment problem (Block B), then sending a default TA value (Block A), and then sending the TA group reconfiguration message (Block C), and so on. Further contemplated flows include B AD CF G, and B-C-E-G, and B-D-C-F-G.

Figure 8:
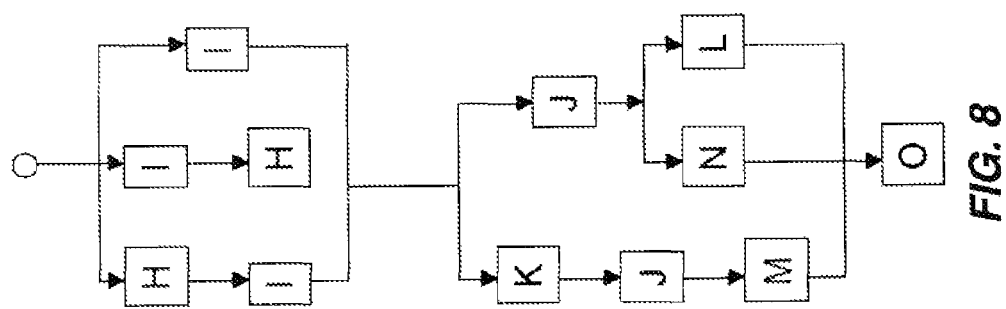
FIGS. 7 and 8 are logic flow diagrams illustrating example details and variations for the TA initialization methods of FIGS. 4 and 6.

FIG. 8 illustrates further processing flows contemplated herein, for both network-side and device-side aspects of the TA value initialization method taught herein. As with the example flows illustrated in FIG. 7, FIG. 8 illustrates a number of contemplated processing "flows" based on various combinations of processing blocks H through O in which:
"H" denotes signaling by the network 10 of a default TA offset value to be used as the initial value for a newly created TA group, e.g., upon a TA group split;
"I" denotes detection by the network 10 that the uplink signals from a device 20 for at least one cell in an existing TA group of the device 20 are not arriving time aligned. The TA value for that existing TA group is therefore not suitable for one or more cells 12, 16, in the existing TA group;
"J" denotes the network 10 signaling a TA group reconfiguration message ordering the device 20 to split the TA group for which the timing misalignment was detected;
"K" denotes the network 10 sending an explicit offset value for the new TA group;
"L" denotes the device 20 applying the TA value of the old TA group to the new TA group—here, the old TA group is the group for which timing misalignment was detected on at least one cell by the network 10 and the new TA group is the TA group created by the split of the old TA group;
"M" denotes the device 20 applying the TA value of the old TA group to the new TA group, with an offset set according to a TA offset value signaled by the network 10;
"N" denotes the device 20 applying the TA value of the old TA group to the new TA group, with an offset set according to a default offset, e.g., a preconfigured offset stored in the device 20; and
"O" denotes the device 20 performing carrying out TA group reconfiguration processing.

With the above processing block definitions, FIG. 8 illustrates the following distinct processing flow possibilities: H-I-K-J-M-O; H-I-J-N-O; H-I-J-L-O; I-H-K-J-M-O; I-H-J-N-O; I-H-J-L-O; I-K-J-M-O; I-J-N-O; and I-J-L-O. All such processing flow possibilities offer the advantage of avoiding random access procedures, for the case where a new TA group includes one or more cells 12, 16 having a known TA relationship to one or more cells 12, 16 in an old or existing TA group of the device 20. To better appreciate the benefits of avoiding random access procedures for TA value initialization, it must be noted that performing random access procedures increases the load of the RACH channel, costs device battery power and adds processing time.

That is, random access procedures take time to perform, which causes delays in gaining uplink synchronization for those cells 12, 16 in a newly created TA group. Whenever a device 20 is out of uplink synchronization with respect to a serving cell 12, 16, scheduling opportunities are lost and that loss negatively impacts the user experience. Furthermore, with any random access procedure there is a risk for random access failure in which case a new random access procedure needs to be performed. Avoiding performing random access procedures will therefore lessen RACH load, decrease power consumption at the device 20 and shorten delays, all improving the user experience and overall system performance.

Figure 9:
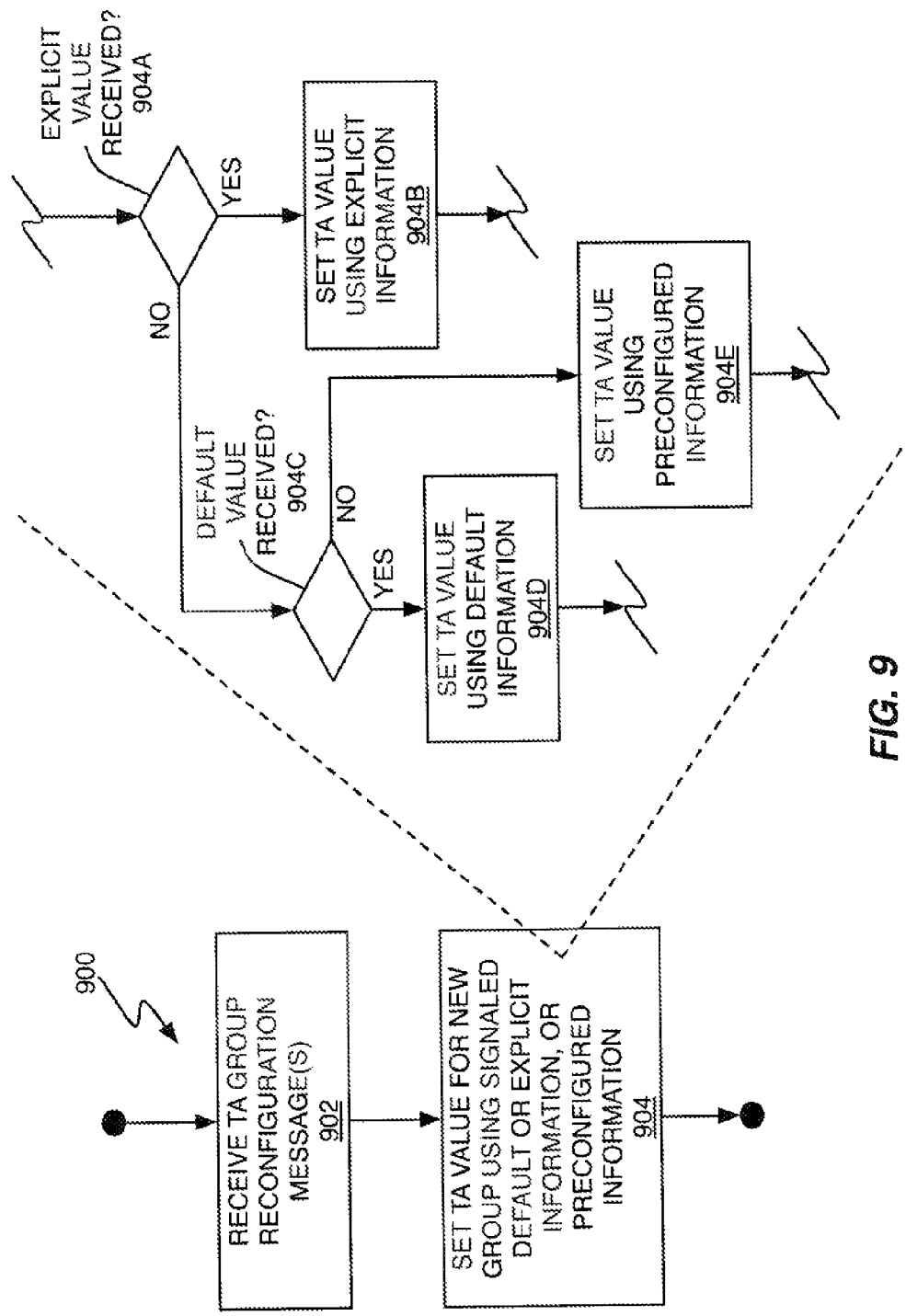
FIG. 9 is a logic flow diagram illustrating additional example details for a method of TA value initialization at a wireless communication device.

FIG. 9 illustrates further processing options for a device 20, according to one or more embodiments contemplated herein. The method 900 illustrated in FIG. 9 can be understood as an extension or variation of the earlier-described method 400 shown in FIG. 4. The method 900 includes the device 20 receiving one or more TA group reconfiguration messages from the network 10 (Block 902), and setting the TA value for the new TA group using signaled default or explicit TA information, or using preconfigured information at the device 20 (Block 904). Here, the term "information" broadly encompasses actual TA values, pointers to actual TA values, actual TA offset values, pointers to actual TA offset values, and essentially any other data item that serves the purpose of indicating to the device 20 the basis for initializing the TA value of the new TA group being created via the TA group reconfiguration message(s). As before, "default" TA information is signaled in advance of the TA group reconfiguration messages, and "explicit" TA information is signaled as part of the TA group reconfiguration messaging.

The right side of the diagram expands example processing details for the operations performed in Block 904. Such example processing includes determining whether an explicit TA value was received as part of the one or more TA group reconfiguration messages (Block 904A). If so (YES from Block 904A), the device 20 sets the TA value of the new TA group using the explicit TA information (Block 904B). If no, (NO from Block 904A), the device 20 determines whether it has default TA information earlier received from the network 10 (Block 904C).

If so (YES from Block 904C), the device 20 initializes the TA value of the new TA group using the default TA information (Block 904D). If not (NO from Block 904C), the device 20 initializes the TA value of the new TA group using preconfigured TA information (Block 904E). The preconfigured information may be a preconfigured TA offset value that the device 20 applies to the TA value of one of its existing TA groups, as one example.

Figure 10:
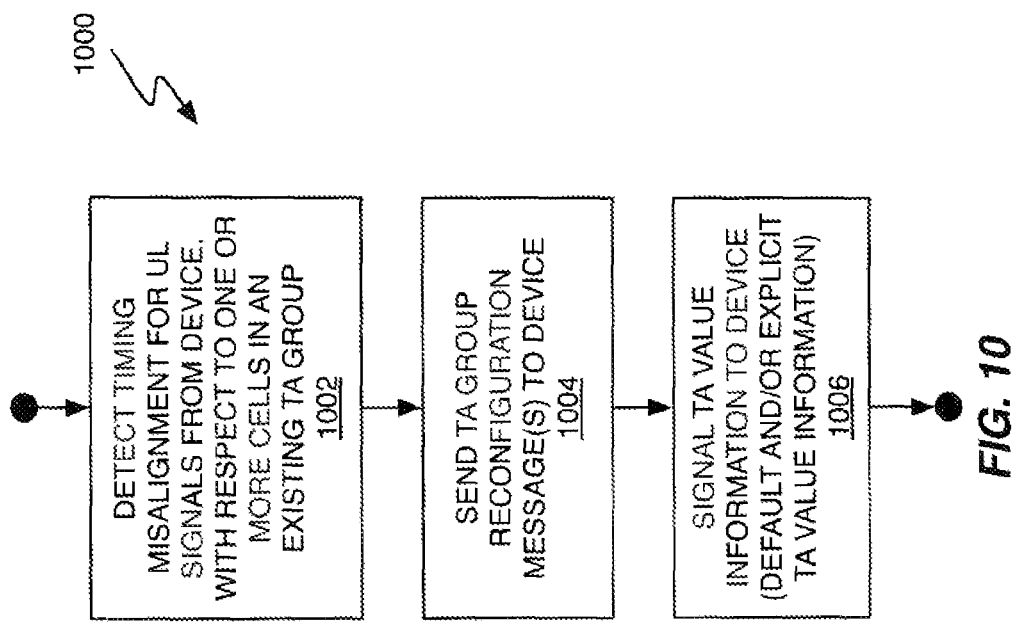
FIG. 10 is a logic flow diagram illustrating additional example details for a method of TA value initialization at a network node.

In a more particular, example, the device 20 is configured to apply a TA offset value—known from the network 10 or from preconfigured information at the device 20—to the TA value in use at the device 20 for a TA group that is being split by the network 10. As noted earlier herein, the network 10 may split an existing TA group of the device 20 in response to detecting timing misalignment for one or more cells 12, 16 in that existing TA group. FIG. 10 illustrates this approach from the network perspective, where such processing is carried out in one of the base stations 14, 18 for example.

The method 1000 illustrated in FIG. 10 includes: detecting uplink timing misalignment for the uplink signals from a device 20, with respect to one or more cells 12, 16 in an existing TA group of the device 20 (Block 1002); sending one or more TA group reconfiguration messages to the device 20, to split out the "misaligned" cells 12, 16 into a new TA group (Block 1004); and signaling TA value information—explicit or default—to the device 20, for use at the device 20 in setting the TA value for the new TA group (Block 1006).

Notably, modifications and other embodiments of the disclosed invention(s) will come to mind to one skilled in the art having the benefit of the teachings presented in the foregoing descriptions and the associated drawings. For example, the references to UEs and to LTE-based networks should be understood as non-limiting examples. The same methods can be applied in a range of wireless communication network and device types, such that the network base stations and the corresponding wireless communication devices are configured according to the teachings herein.

What is claimed is:

1. A method of timing alignment processing for uplink signal transmissions by a wireless communication device to one or more cells in a wireless communication network, the method comprising:
   receiving one or more messages indicating the creation of a new Timing Advance (TA) group for the device;
   selecting an existing TA group from among existing TA groups of the device, according to a configured selection rule or according to signaling received from the network; and
   setting a TA value to be applied at least initially for uplink transmissions to cells in the new TA group, based on a current TA value used for the selected TA group.

2. The method of claim 1, wherein selecting the existing TA group comprises selecting the existing TA group that includes a primary cell for the device, and wherein setting the TA value comprises setting the TA value equal to or offset from the current TA value of the selected TA group that includes a primary cell for the device.

3. The method of claim 2, wherein selecting the existing TA group comprises selecting the existing TA group that includes a primary cell for the device, and wherein setting the TA value comprises calculating the TA value by applying an offset value to the current TA value in use for the selected TA group that includes the primary cell for the device.

4. The method of claim 1, wherein selecting the existing TA group comprises selecting the existing TA group according to the signaling received from the network indicating the selected TA group.

5. The method of claim 1, wherein selecting the existing TA group comprises selecting the existing TA group according to the configured selected rule.

6. The method of claim 2, further comprising receiving the offset value via the signaling from the network.

7. The method of claim 1, further comprising receiving a signaled TA value as a default TA value sent in advance of the one or more messages and setting the TA value to the default TA value.

8. The method of claim 1, further comprising adjusting the TA value responsive to subsequent TA adjustment commands signaled from the network.

9. A wireless communication device comprising:
   a transceiver configured to transmit uplink signals to one or more cells in a wireless communication network and to receive downlink signals from one or more cells in the network; and
   one or more processing circuits configured to perform timing alignment processing for uplink signal transmissions by the device, based on being configured to:
      receive one or more messages via the transceiver, indicating the creation of a new Timing Advance (TA) group for the device;
      select an existing TA group from among existing TA groups of the device, according to a configured selection rule or according to signaling received from the network; and
      set a TA value to be applied at least initially for uplink transmissions to cells in the new TA group, based on a current TA value used for the selected TA group.

10. The device of claim 9, wherein the one or more processing circuits are configured to select the existing TA group that includes a primary cell for the device and set the TA value equal to or offset from the current TA value of the selected TA group that includes a primary cell for the device.

11. The device of claim 10, wherein the one or more processing circuits are configured to select the existing TA group that includes a primary cell for the device and set the TA value by calculating the new TA based on applying an offset value to the current TA value in use for the selected TA group that includes the primary cell for the device.

12. The device of claim 9, wherein the one or more processing circuits are configured to select the existing TA group according to the signaling received from the network indicating the selected TA group.

13. The device of claim 9, wherein the one or more processing circuits are configured to select the existing TA group according to the configured selection rule.

14. The device of claim 11, wherein the one or more processing circuits are configured to receive the offset value via the signaling from the network.

15. The device of claim 9, wherein the one or more processing circuits are configured to set the TA value based on receiving a signaled TA value as a default TA value sent in advance of the one or more messages and set the TA value to the default TA value.

16. The device of claim 9, wherein the one or more processing circuits are configured to adjust the TA value responsive to subsequent TA adjustment commands signaled from the network.

17. A method of timing alignment processing in a network node configured for operation in a wireless communication network, said method comprising:
sending one or more Timing Advance (TA) reconfiguration messages to a wireless communication device, to create a new TA group for the device, wherein the new TA group includes one or more new cells having a known or estimated delay relative to a current TA value in use for an existing TA group of the device;
signaling a TA value to the device as a calculated TA value determined from the current TA value in use for the existing TA group and the known or estimated relative delay of the new cell(s), or as a TA offset value based on the known or estimated relative delay of the new cell(s), wherein the signaled TA value or TA offset value will be used by the device in setting a TA value initially applied to the new TA group; and
sending adjustment commands to the device, as needed, subsequent to the creation of the new TA group, to adjust the TA value.

18. The method of claim 17, wherein the new TA group includes one or more cells being split from the existing TA group, and wherein signaling the TA value or TA offset value to be used by the device for the new TA group comprises: signaling the TA value as a value equal to or offset from a current TA value in use for the existing TA group; or signaling the TA offset value as a value relative to the current TA value in use for the existing TA group.

19. The method of claim 17, further comprising creating the new TA group responsive to detecting a timing misalignment for uplink signal transmissions by the device to one or more cells in the existing TA group.

20. The method of claim 17, wherein the known or estimated relative delay of the new cell(s) comprises a known or estimated difference in processing delays between nodes associated with the existing TA group and the new TA group.

21. The method of claim 17, wherein the known or estimated relative delay of the new cell(s) is based at least in part on the cell size of one or more new cells in the new TA group and one or more cells in the existing TA group.

22. The method of claim 17, wherein signaling the TA value or the TA offset value comprises signaling a default TA value in advance of the one or more reconfiguration messages.

23. The method of claim 17, wherein signaling the TA value or the TA offset value comprises signaling a default TA offset value in advance of the one or more reconfiguration messages.

24. The method of claim 17, wherein the existing TA group is one among two or more existing TA groups, and wherein signaling the TA value or the TA offset value comprises sending an indication to the device that indicates which one of the existing TA groups the device should select for use in setting the TA value, and wherein the device is configured to set the TA value to the current TA value of the selected TA group, or to calculate the TA value by offsetting the current TA value of the selected TA group.

25. A network node configured for operation in a wireless communication network, said node comprising:
one or more communication interfaces, including at least one of: an RF transceiver configured for receiving uplink signals from wireless communication devices operating in one or more cells of the wireless communication network and transmitting downlink signals to the one or more wireless communication devices; and an inter-node communication interface configured for communication with one or more other network nodes; and
one or more processing circuits operatively associated with the one or more communication interfaces and configured to:
send one or more Timing Advance (TA) reconfiguration messages to a wireless communication device, to create a new TA group for the device, wherein the new TA group includes one or more new cells having a known or estimated delay relative to a current TA value in use for an existing TA group of the device;
signal a TA value to the device as a calculated TA value determined from the current TA value in use for the existing TA group and the known or estimated relative delay of the new cell(s), or as a TA offset value based on the known or estimated relative delay of the new cell(s), wherein the signaled TA value or TA offset value will be used by the device in setting a TA value initially applied to the new TA group; and
send adjustment commands to the device, as needed, subsequent to the creation of the new TA group, to adjust the TA value.

26. The node of claim 25, wherein the new TA group includes one or more cells being split from the existing TA group, and wherein the one or more processing circuits are configured to signal the TA value or TA offset value based on one of: signaling the TA value as a value equal to or offset from a current TA value in use for the existing TA group; or signaling the TA offset value as a value relative to the current TA value in use for the existing TA group.

27. The node of claim 25, wherein the one or more processing circuits are configured to create the new TA group responsive to detecting a timing misalignment for uplink signal transmissions by the device to one or more cells in the existing TA group.

28. The node of claim 25, wherein the known or estimated relative delay of the new cell(s) comprises a known or estimated difference in processing delays between nodes associated with the existing TA group and the new TA group.

29. The node of claim 25, wherein the known or estimated relative delay of the new cell(s) is based at least in part on the cell size of one or more cells in the new TA group and one or more cells in the existing TA group.

30. The node of claim 25, wherein the one or more processing circuits are configured to signal the TA value or the TA offset value based on signaling a default TA value in advance of the one or more reconfiguration messages.

31. The node of claim 25, wherein the existing TA group is one among two or more existing TA groups, and wherein the one or more processing circuits are configured to signal the TA value or the TA offset value by sending an indication to the device that indicates which one of the existing TA groups the device should select for use in setting the TA value, and wherein the device is configured to set the TA value to the current TA value of the selected TA group, or to calculate the TA value by offsetting the current TA value of the selected TA group.

* * * * *